Dec. 21, 1965
B. BURLEY
3,225,214
TRANSISTORIZED R-C NETWORK
Filed June 29, 1962
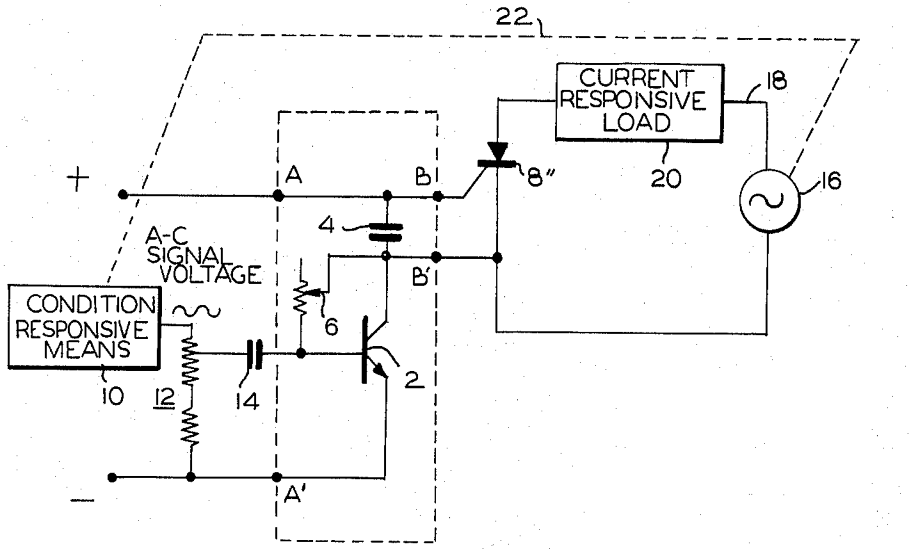
FIG. 1.
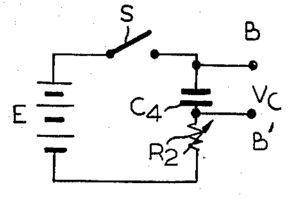
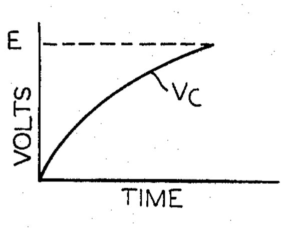
FIG. 2.
FIG. 3
*INVENTOR*
BILLY BURLEY
BY *Scrivener & Parker*
*ATTORNEYS*

United States Patent Office 3,225,214

Patented Dec. 21, 1965

3,225,214

TRANSISTORIZED R-C NETWORK

Billy Burley, Dallas, Tex., assignor, by mesne assignments, to Johnson Service Company, Milwaukee, Wis., a corporation of Wisconsin Filed June 29, 1962, Ser. No. 206,346
1 Claim. (Cl. 307—88.5)

This invention relates generally to an adjustable R-C network, and more particularly to a transistorized R-C network the resistance component of which comprises transistor means operable to accurately and adjustably control the time constant of the network.

The use of R-C timing networks for controlling the operation of various electronic apparatus, such as oscillators, switching circuits, control systems and the like, is, of course, conventional in the art. In many cases the resistance and/or capacitance elements of the circuit are adjustable in order that the time constant of the network may be varied as desired. One drawback of the known adjustable networks is the difficulty in obtaining accurate, instantaneous automatic adjustment in response to deviations in a condition from a predetermined value. The present invention was developed to avoid the drawbacks of the known devices and to provide an inexpensive electronic control using a transistorized R-C network that affords instantaneous electrical adjustment in response to control signals.

The primary object of the present invention is to provide an R-C network the "resistance" component of which comprises a transistor.

A more specific object of the invention is to provide an R-C network consisting of a capacitor connected in series with the emitter to collector circuit of a transistor, the base electrode of said transistor affording control means for adjusting the effective "resistance" of the emitter to collector circuit of the transistor and the time constant of the network.

A further object of the invention is to provide a transistorized R-C network the time constant of which is adjustable in accordance with the effective potential of the base electrode of a transistor. In accordance with the present invention, the time constant of the network may be varied as a function of the D.-C. bias applied to the base electrode of a transistor the emitter and collector electrodes of which are connected in series with a capacitor. According to another feature of the invention, the time constant of the network may be varied as a function of an alternating-current signal voltage superimposed upon the D.-C. biasing potential applied to the base electrode of a transistor.

Another object of the invention is to provide an electronic control system including an R-C network having a pair of input terminals across which a capacitor is connected in series with the emitter to collector electrodes of a transistor, load circuit means connected in parallel with the capacitor and affording a D.-C. path to the emitter to collector circuit of said transistor, means applying a D.-C. potential across said network input terminals, and adjustable means applying a biasing voltage to the base electrode of the transistor.

Other objects and advantages of the invention will become apparent from a study of the following specification when considered in conjunction with the accompanying drawing, in which:

FIG. 1 illustrates an electronic control system utilizing the R-C network of the present invention;

FIG. 2 is a simplified circuit diagram of the network of FIG. 1; and

FIG. 3 is a plot of capacitor charging voltage versus time corresponding with the circuit of FIG. 2.

Referring to FIG. 1, the R-C network of the present invention includes a transistor 2 having an emitter to collector circuit connected in series with capacitor 4 across network input terminals $A$–$A^1$. Variable resistor 6 is connected across the base and collector electrodes of transistor 2 as shown. Network output terminals $B$–$B^1$ are connected with opposite sides of capacitor 4.

In the illustrated operational embodiment of the invention, network input terminals $A$–$A^1$ are connected with the positive and negative poles, respectively, of a D.-C. voltage source, and network output terminals $B$–$B^1$ are connected with the gate to cathode circuit of silicon controlled rectifier 8. This gate to cathode circuit defines a direct-current path in parallel with capacitor 4. Condition-responsive means 10, which may comprise a condition-responsive balanced bridge network of the variable resistance, capacitance, inductance or impedance type operable to produce an A.-C. signal voltage the magnitude of which is proportional to the degree of deviation of a sensed condition from a predetermined value, is connected with the base electrode of transistor 2 via voltage divider 12 and coupling capacitor 14. The anode to cathode circuit of silicon controlled rectifier 8 is connected with alternating-current source 16 via conductor 18 including current responsive load 20. As shown schematically by broken line 22, condition-responsive means 10 is inductively coupled with A.-C. source 16 so that the A.-C. signal voltage has the same frequency as, and a given phase relationship relative to, the A.-C. source. The control circuit of FIG. 1 is disclosed in greater detail and is claimed in my companion patent application Serial No. 206,345 filed June 29, 1962, and now abandoned, and entitled "Condition-Responsive Electronic Control."

*Operation*

In operation, a D.-C. path is established from the positive to the negative poles of the D.-C. source via network terminals A and B, the gate to cathode circuit of silicon controlled rectifier 8, terminal $B^1$, the collector to emitter circuit of transistor 2, and terminal $A^1$. The setting of base electrode biasing resistor 6 determines the level of the D.-C. quiescent current flowing through the gate to cathode circuit of SCR 8. As shown in FIG. 2, transistor 2 may be considered as being a variable "resistor" connected in series with capacitor 4 to define an R-C network having a time constant of $R_2$ times $C_4$. The capacitor voltage may be expressed by the formula $$V_c = E[1 - e^{-t/R_2C_4}] \qquad (1)$$

From this equation it can be seen that upon closing of switch S, the capacitor is gradually charged to battery potential E as shown by the capacitor charging curve of FIG. 3. It is apparent from Equation 1 that if either or both of the values of the capacitor and resistor are changed, the slope of the capacitor charging curve will be varied. If the product of the resistance and capacitance is made larger, then the time required for $V_c$ to reach E will be increased. Conversely, if the product of resistance and capacitance is made smaller, the time required for $V_c$ to reach E will be decreased. By appropriate adjustment of resistor 6, the effective "resistance" of transistor 2 and the resultant time constant of the transistorized R-C network may be varied as desired.

Similarly, the "resistance" of transistor 2 and the time constant of the R-C network is varied in accordance with the magnitude of the A.-C. signal voltage applied to the base electrode via voltage divider 12 and capacitor 14. As disclosed in the aforementioned application entitled "Condition-Responsive Electronic Control," resistor 6 is set to establish a D.-C. quiescent current level that is slightly below the gate triggering current level of silicon controlled rectifier 8. When the condition responsive balanced bridge network varies in a sense to produce a signal voltage having a phase relationship relative to reference voltage 16 which causes the anode and gate electrodes to be positive relative to the cathode electrode, and the magnitude of the amplified signal voltage is such that the instantaneous value of the gate current exceeds the triggering value, SCR 8 switches from a non-conductive to a conductive condition. The magnitude of the bridge unbalance signal controls the "resistance" of the transistor, the time constant of the R-C circuit, and consequently the "conduction angle" (i.e., time of firing) of the silicon controlled rectifier relative to the reference voltage. Since silicon controlled rectifier 8 becomes non-conductive during alternate negative half cycles of the reference voltage, the effective level of the pulsating direct current sensed by load 20 is a function of the conduction angle of SCR 8, the magnitude of the signal voltage, and the degree of deviation of the sensed condition from a predetermined value.

While transistor 2 has been illustrated as being of the n-p-n type, it is apparent that by appropriate circuit modification, transistors of the p-n-p type may also be used in the R-C network of the present invention. Other changes and modifications in the illustrated apparatus will be apparent to those skilled in the art without deviating from the invention set forth in the following claim.

What is claimed is:

An electronic control system having an adjustable time constant network for supplying power to a load, comprising network means including a pair of input terminals, a pair of output terminals, a transistor having emitter, collector and base electrodes, a capacitor, and circuit means connecting said capacitor and the emitter to collector circuit of said transistor in series between said input terminals to define a resistive-capacitive network wherein the time constant is determined by the conductivity of the transistor, said output terminals being connected with opposite ends of said capacitor, respectively;

load means connected between said output terminals to define a direct current path in parallel with said capacitor;

means applying a direct-current potential across said input terminals;

means applying a direct-current biasing potential upon said base electrode to establish a quiescent flow of direct current through the emitter to collector circuit of said transistor for establishing a selected time constant for said network, said biasing means comprising an adjustable resistor connected at one end with said base electrode and at the other end with at least one of said emitter and collector electrodes;

and means connected with said base electrode for superimposing an alternating-current signal voltage upon said direct-current biasing potential to control the conductivity of the transistor and vary the time constant of the network established by said adjustable resistor.

References Cited by the Examiner

UNITED STATES PATENTS

| | | | |
|---|---|---|---|
| 2,801,346 | 7/1957 | Rongen et al. | 307—88.5 |
| 3,106,668 | 10/1963 | Ditto | 307—88.5 |

OTHER REFERENCES

Selected Semiconductor Circuits Handbook, 1960 by John Wiley and Sons, Inc. (circuit 10–4).

Solid State Products, Inc., bulletin D420–02, December 1959, "Applications and Circuit Design Notes," pages 22–24.

ARTHUR GAUSS, *Primary Examiner.*